UNITED STATES PATENT OFFICE.

BEST AVAILABLE COPY

BEST AVAILABLE COPY

HENRY PEMBERTON, OF ALLEGHENY CITY, PENNSYLVANIA.

IMPROVEMENT IN REFINING HYDROCARBON OILS AND UTILIZING WASTE PRODUCTS THEREFROM.

Specification forming part of Letters Patent No. 24,952, dated August 2, 1859; Reissue No. 2,431, dated January 1, 1867; Reissue No. 2,539, dated April 2, 1867.

*To all whom it may concern:*

Be it known that I, HENRY PEMBERTON, of the city of Allegheny and State of Pennsylvania, (formerly of East Tarentum, in said county and State,) have invented a new and useful Improvement in the Process of Refining Coal-Oils and Utilizing Waste Products therefrom; and I do hereby declare the following to be a full, clear, and exact description of the same.

My invention consists in the mode hereinafter described of treating the residuum left after the purification of the hydrocarburets obtained from the distillation of coals, petroleum, and other bituminous articles, for the purpose of recovering the sulphuric acid employed in the process of purification, which has not, so far as I know, been heretofore successfully accomplished.

The products resulting from the destructive distillation of cannel-coal, bituminous coal, bituminous shale, petroleum, or mineral naphtha, and other similar substances, require to go through a process of purification, in order to remove those substances which are susceptible of decomposition by, or of combination with, acid and alkali, and the presence of which would be highly injurious.

The process ordinarily employed in the purification of these liquid and solid hydrocarburets consists in separating, by distillation, those combinations which have less density and a lower boiling-point from those which are specifically heavier and less volatile, and, after being purified as far as practicable in this manner, subjecting them to the action of concentrated sulphuric acid and a strong solution of caustic alkali, in order to remove from the neutral oils all substances capable of being decomposed, or of entering into combination with those reagents. The quantity of acid and alkali required to effect these changes varies considerably, and depends on the nature of the crude material originally employed. As the quantity of such oils now manufactured is very large, and constantly increasing, and as the expense of these chemical agents used in their purification greatly enhances the cost, it becomes a matter of considerable importance to recover, if possible, a part, if not all, of the acid and alkali thus employed. No difficulty has been experienced in regaining the alkali, as its indestructible nature allows of its being subjected (either when pure or in combination with organic acids and other compounds) to a high degree of heat, which burns out and destroys the organic matter, and merely converts the alkalies into carbonates, in which state they retain a large part of their commercial value, and may, if desired, be easily restored to their caustic state by treatment with lime, in the usual way. It is different, however, with the sulphuric acid after it has acted on the coal-oils, for the exposure of the acid to a sufficiently high heat to destroy the matters then found in combination therewith will decompose the acid itself, the tarry matters and organic acid present in the residuum which contains the sulphuric acid causing it (the acid) to yield oxygen to them, and, itself undergoing decomposition, forming sulphurous acid, and a mixture of carbonic acid, carbonic oxide, and volatile pyroligneous matters, which prevent the employment of the sulphurous acid in the acid-chambers for the re-formation of sulphuric acid, and almost, if not entirely, destroy its usefulness for any purpose whatever. The fact of this union of organic bases with the sulphuric acid, and the appearance of the mixture, which, in its partial transparency and uniform consistency, exactly resembles a definite combination, has seemed to preclude any method of separating the acid from the tar. I have discovered, however, that water can be made to act in a similar way to a base, and unite with the sulphuric acid, and thus replace and liberate the tar, so that by subsequent subsidence the tar will separate from the compound of sulphuric acid and water, and float thereon, and can be separately drawn off or removed.

I have discovered that heat and agitation promote the chemical action, as above, and that the introduction of steam is a convenient mode of effecting these two purposes. I have also discovered that the subsequent repetition of this process continues to purify the acid, and that the acid obtained as above may be either concentrated and reused, as at first, or it may be used, without further or with only partial concentration, for the decomposition of common salt in the production of sulphate of soda in the soda-ash manufacture, and for many other purposes requiring the use of sulphuric acid.

The residuum resulting from the hydrocarburets known as "coal-oils," consisting of a mixture of tarry matters and acid, may be first subjected to a low heat, not above 212° Fahrenheit, (the boiling-point of water,) in a suitable vessel, which renders it more fluid, and allows any oil it may yet contain to separate from it, which, as the mixture is then left to cool, will arise to the surface, and may be readily decanted, leaving the residuum, when cold, of the consistency of thick wood-tar. This tarry residuum is then placed in a vessel made of lead, or other material suitable to resist the action of the acid, and of any convenient shape, of about equal depth and diameter, and to it a sufficient quantity of water is added in the same vessel. A pipe is inserted into the vessel so as to be immersed in the residuum and water contained therein, that portion of the pipe which is so immersed being perforated with a number of small holes, through which steam introduced into the pipe escapes, causing a violent ebullition and agitation of the tarry mixture and water, which ebullition and agitation are kept up for a sufficient length of time to bring all the particles of the tarry residuum under treatment in contact with the hot water, and thus cause the sulphuric acid to unite therewith. This process of agitation, in connection with heat and moisture, must be continued for a longer or shorter time, varying from one to ten hours, and even longer, according to the capacity of the vessel and the quantity of tarry matter under treatment, and the process may be accelerated by the mechanical agitation of the contents of the vessel, so as to expose the tarry mixture more thoroughly to the action of the heat and moisture. When the tarry mass is by this process deprived of the acid, it will be found, in the case of oils produced from the distillation of coal and shales, to be completely altered in its properties. Instead of being, as at first, a semi-fluid, and transparent in thin layers, it has become much more dense, even at the high temperature given to it by the steam, and when allowed to cool it will become a hard, resinous, and opaque black mass, readily reducible to powder, and totally deprived of any acid taste; while in the case of petroleums the tar separates as an oily fluid, although portions of it (particularly on the continued action of heat) separate therefrom in tough resinous masses, resembling the hard resinous substance before mentioned.

The aqueous solution of sulphuric acid thus produced is of a brown or yellow color, varying with the different oils from which the residuum was obtained, and of a density depending on the amount of water used in the process, and proves to be nearly pure dilute sulphuric acid, contaminated, however, with small portions of organic matters in solution. The dilute acid thus obtained may be employed, without further purification or concentration, for many purposes, and by evaporation in leaden pans to the density of about 1.45, it is strong enough to be used for the decomposition of common salt, in the production of sulphate of soda, as a step in the manufacture of soda-ash. By pushing the concentration of the dilute sulphuric acid to 1.70, (which is as far as it is safe to carry the process in leaden vessels,) the acid obtained by my process becomes dark-colored and opaque, evolving a little sulphurous acid. By diluting it now with water, a small quantity of carbonaceous matter separates, leaving the acid much lighter in color. It is then again concentrated, and again slightly diluted with water, and thus becomes a light-brown color; and after again concentrating the acid and diluting with water until the color is sufficiently removed, a little purified animal charcoal or nitric acid may be added, when the sulphuric acid is obtained sufficiently pure to permit of its being still further condensed in platinum, until it is strong enough to be again used, as at first, in the purification of coal-oil. As the quantity of organic matter remaining in the acid after it has been concentrated, as before stated, to about 1.45, or from that density to 1.70, is so inconsiderable as to be no disadvantage in the use of the acid for most purposes, it may be better, in a pecuniary point of view, to carry the process of concentration no further than can be done in leaden vessels.

The process I have described may be varied, if desired, by dispensing with the introduction of steam, or of applying heat outside of the vessel containing the tarry mass, as the heat evolved by the mixture of the acid and water will, in many cases, suffice for the separation of the acid from the tarry or carbonaceous residuum, thus securing the effect of heat and moisture; but the plan I have described is, in my judgment, the most desirable and efficient, as the introduction of steam effects the triple purpose of heat, moisture, and mechanical agitation, and dispenses with the necessity of agitating the residuum and water by means of machinery.

Having thus described my improvement, what I claim as my invention, and desire to secure by Letters Patent, is—

1. Recovering the sulphuric acid from the residuum of the process of refining coal-oil, petroleum, and other hydrocarburets, by treating the residuum with water, which unites with the acid, and replaces and liberates the tarry matter, and then separating the tarry matter from the sulphuric acid and water by subsidence.

2. Agitating water and the residuum of the process of refining coal-oil, petroleum, and other hydrocarburets together, for the purpose of expediting the union of the acid and water and the liberation of the tarry matter.

3. Purifying the dilute sulphuric acid recovered from the residuum which results from the refining of coal-oils, petroleum, and other hydrocarburets, by repeated processes of concentration and dilution with water, whereby the coloring matter is separated, and may be removed, substantially as hereinbefore described.

4. The use of the sulphuric acid recovered from the residuum resulting from the refining of coal-oil, petroleum, and other hydrocarburets, for the decomposition of salt in the production of sulphate of soda, as a step in the manufacture of soda-ash.

H. PEMBERTON.

In presence of—
W. BAKEWELL,
ALEXANDER HAYS.